(12) United States Patent
Fresko et al.

(10) Patent No.: US 8,769,250 B2
(45) Date of Patent: Jul. 1, 2014

(54) TRAP-BASED MECHANISM FOR TRACKING ACCESSES OF OBJECT CLASS NAMES

(75) Inventors: Nedim Fresko, San Francisco, CA (US); Dean R. Long, Boulder Creek, CA (US); Jiangli Zhou, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 546 days.

(21) Appl. No.: 12/554,595

(22) Filed: Sep. 4, 2009

(65) Prior Publication Data

US 2009/0327659 A1    Dec. 31, 2009

Related U.S. Application Data

(62) Division of application No. 11/206,492, filed on Aug. 17, 2005, now Pat. No. 7,711,937.

(51) Int. Cl.
*G06F 9/00* (2006.01)

(52) U.S. Cl.
USPC .......................................... 712/244; 717/127

(58) Field of Classification Search
USPC .......................................... 712/244; 717/127
See application file for complete search history.

(56) References Cited

U.S. PATENT DOCUMENTS

| | | | | |
|---|---|---|---|---|
| 5,088,036 A | * | 2/1992 | Ellis et al. | 707/999.206 |
| 6,230,313 B1 | * | 5/2001 | Callahan et al. | 717/128 |
| 6,543,006 B1 | * | 4/2003 | Zundel et al. | 714/19 |
| 6,604,210 B1 | * | 8/2003 | Alexander et al. | 714/39 |
| 6,738,875 B1 | * | 5/2004 | Wang | 711/159 |

* cited by examiner

*Primary Examiner* — David J Huisman
(74) *Attorney, Agent, or Firm* — Osha Liang LLP (57) ABSTRACT

In general, the invention relates to a method. The method includes receiving notification, which includes context information, of a trap. The method further includes accessing, based at least partially upon the context information, a particular instruction that caused the trap, determining, based at least partially upon the context information, a particular address that is to be accessed by the particular instruction, updating a set of log information to indicate accessing of the particular address, causing subsequent accesses of the particular address to not give rise to a trap, after causing subsequent accesses of the particular address to not give rise to a trap, accessing the particular address, after accessing the particular address, causing subsequent accesses of the particular address to give rise to a trap, and causing the particular instruction to not be executed.

10 Claims, 7 Drawing Sheets

TRAP-BASED MECHANISM FOR TRACKING ACCESSES OF OBJECT CLASS NAMES

CROSS-REFERENCE TO RELATED APPLICATIONS

This application is a divisional application and claims benefit under 35 U.S.C. §120 of U.S. patent application Ser. No. 11/206,492, filed on Aug. 17, 2005, now U.S. Pat. No. 7,711,937 entitled "Trap-Based Mechanism for Tracking Accesses of Logical Components," in the name of Nedim Fresko et al.

BACKGROUND

In a typical Java implementation, whenever a Java application is executed, an instance of a Java virtual machine (JVM) is also started to support the execution of the Java application. If x Java applications are run concurrently, there would be x JVM instances. Typically, each JVM instance is an independent instance that is unaware of the other JVM's; thus, each JVM creates its own data structures and manages its own memory usage. There are many common data structures that are used by all JVM's. Because the various JVM instances are independent, they do not share these common data structures; rather, these data structures are duplicated by each JVM. The common data structures are usually stored in physical memory. That being the case, the physical memory will contain multiple copies of the common data structures (one copy per JVM), which is an inefficient use of the physical memory. In some implementations (e.g. personal digital assistants, cellular phones, etc.), physical memory is quite limited. In such implementations, this duplication of common data structures is highly undesirable.

Figure 1:
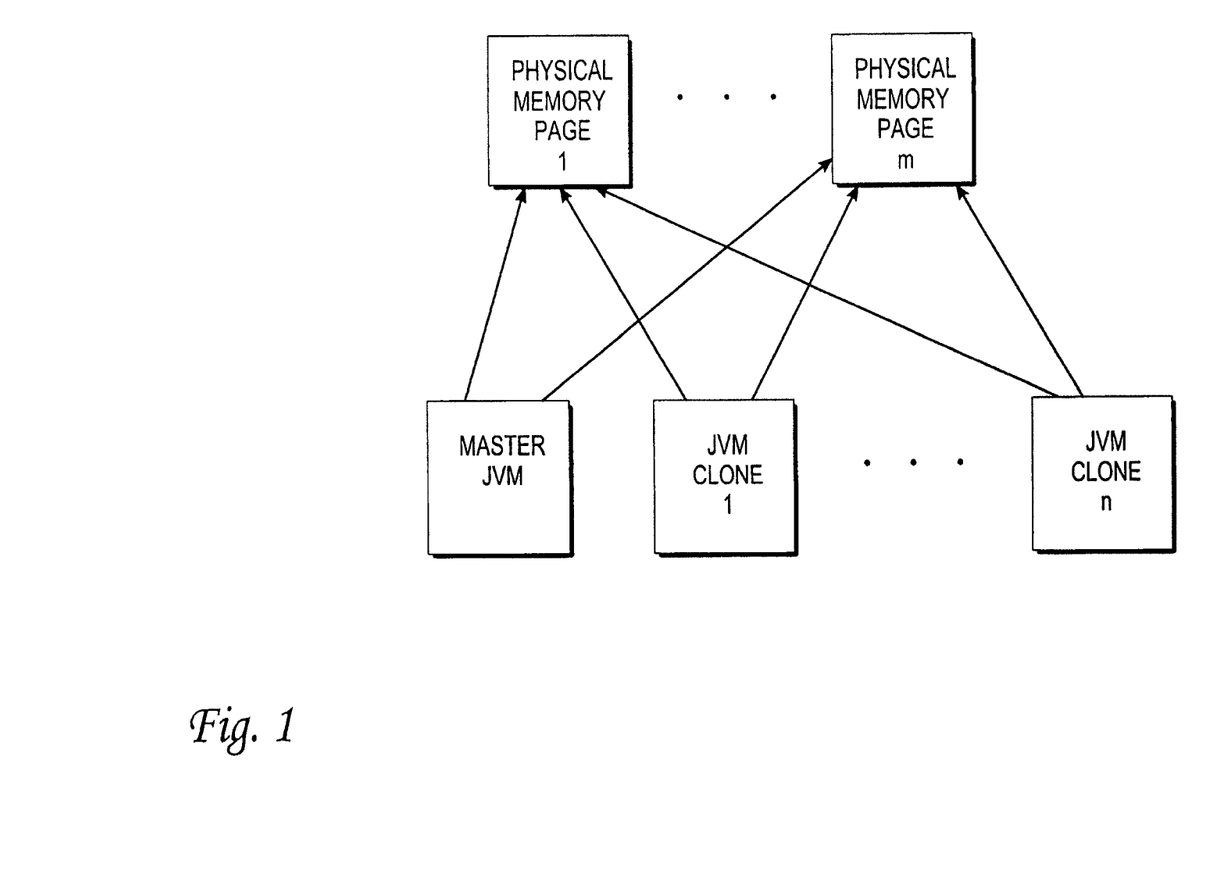
FIG. 1 is a block diagram illustrating the sharing of a plurality of physical memory pages by a plurality of processes.

The amount of common data structure duplication between multiple JVM instances can be significantly reduced by making "clones" of a master JVM. To do so, a master JVM is first instantiated. The master JVM is then initialized with all of the common data structures that will be shared by all of the JVM instances. These common data structures are stored in physical memory pages. Then, one or more "clones" of the master JVM are made (this may be done, for example, by using a "fork" instruction in Unix). Created in this way, each clone is still an independent JVM instance, but all of the clones will share the common data structures and reference the same physical memory pages. This is shown in FIG. 1, wherein the master JVM and the n number of JVM clones all reference and share the physical memory pages in which the common data structures are stored. Thus, the JVM clones do not maintain their own copies of the common data structures but rather share a common copy.

Figure 2:
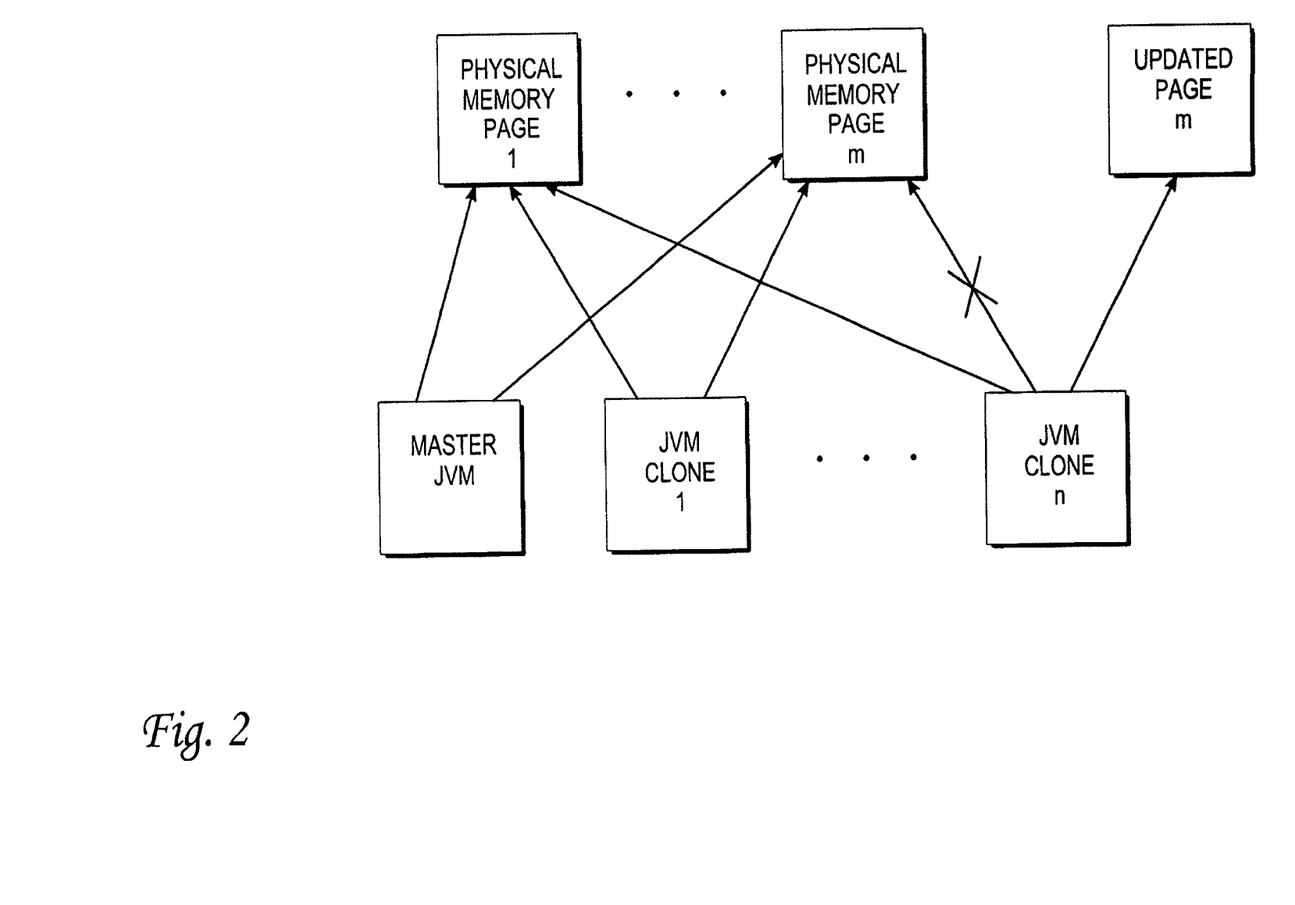
FIG. 2 is a block diagram illustrating what occurs when one of the processes writes to one of the shared physical memory pages.

The sharing of the memory pages continues as long as none of the JVM's writes to one of the shared pages. If a JVM does write to one of the shared pages, then that JVM will no longer share that page with the other JVM's. For example, suppose that JVM clone n writes to and updates memory page m (see FIG. 2). When that happens, a copy of that page is made and the update is written into that page (updated page m) only. The original page m is not changed. Thereafter, JVM clone n will reference the updated page m, while the other JVM's will still reference the old page m. Notice that this update to page m does not affect the other pages. JVM clone n will still reference and share the other pages with the other JVM instances. Thus, a JVM instance will share a page with the other JVM instances unless and until it makes an update to that page.

In such a cloning implementation, it is desirable to share the memory pages as much as possible. This in turn means that the JVM clones should write to the shared pages as little as possible. The fewer the number of writes to the shared pages, the fewer the number of new pages that will be created and the more page sharing there will be. To maximize page sharing, it is desirable to be able to determine for each JVM clone how many new pages are created as a result of that JVM clone writing to the shared pages. This will reveal how much marginal memory is being consumed by the JVM clone (where marginal memory is the memory consumed by a JVM clone not including the shared memory pages). It is also desirable to be able to determine which portions of the JVM code are causing the writes to the shared pages. Given this information, it may be possible to change the code of the JVM to minimize and perhaps even eliminate writes to the shared pages. Currently, to obtain such information, many lines of instrumentation code would have to be added to the JVM code to detect and to record the writes to the shared pages. This instrumentation code would require a significant amount of effort to implement, and would significantly slow down the execution of the JVM. Thus, even though this approach is theoretically possible, it is not practically viable in many situations.

SUMMARY

To enable greater visibility into the memory accesses of a process, such as a JVM, one embodiment of the present invention provides a trap-based mechanism for detecting and recording the memory accesses of a process. By making the mechanism trap-based, it is possible to gain greater visibility into the memory accesses of the process without adding an extensive amount of instrumentation code to the process.

In one embodiment, to detect and record the memory accesses of a process, a virtual address range (or a plurality of virtual address ranges) of the process is set to a protected status. This address range represents the range of virtual addresses that are to be monitored for access. In the case of a JVM in a cloned setting, this address range may be the address range or address ranges that correspond to the common data structures in the shared pages. By setting the address range to a protected status, whenever an access (in one embodiment, whenever a write) is made to an address within that address range, a trap arises. When the trap arises, a trap handler is invoked. When invoked, the trap handler records the virtual address that was accessed. In this manner, the access of the virtual address is detected and recorded.

In one embodiment, the trap handler operates in one of two modes: (1) all accesses mode; and (2) page count mode. In all accesses mode, the trap handler records all writes to the addresses within the protected address range to generate a complete log of the virtual addresses within the protected address range that were written to. In page count mode, the trap handler records just the first write to any virtual address within a virtual address page (a virtual address page maps to a physical memory page). All subsequent writes to virtual addresses within that virtual address page are not recorded. By recording just the first write, the trap handler is basically keeping track of all of the virtual address pages that have been written to by the process. Since, in the cloned JVM setting, writing to a virtual address page causes a copy of that page to be made, thereby causing a new physical memory page to be consumed, the number of virtual address pages written to by the process provides an indication as to the number of additional physical memory pages (i.e. the marginal memory) that are consumed by the process.

In one embodiment, the trap handler operates as follows in the all accesses mode. Initially, the trap handler receives notification that a trap has occurred. Included in this notification is a set of context information, which may comprise, for example, a program counter value and a plurality of internal register values. Based at least partially upon the context information, the trap handler determines which particular instruction caused the trap, and which particular virtual address was to be accessed by the instruction. In one embodiment, the instruction is an instruction to write a particular value into a particular virtual address. In such a case, the trap handler also determines what particular value was to be written into the particular virtual address. After determining the particular virtual address to be accessed, the trap handler updates a set of log information to indicate the accessing of the particular virtual address. The accessing of the particular virtual address is thus recorded.

Because the particular instruction has been trapped, it has not been executed. To give the particular instruction effect, the trap handler emulates its execution. More specifically, the trap handler causes the particular value to actually be written into the particular virtual address. In one embodiment, the trap handler does so by first changing the status of the virtual address page in which the particular virtual address is encompassed to unprotected. Doing so causes subsequent attempts at writing to the virtual address page to not give rise to a trap. Then, the trap handler causes the particular value to be written into the particular virtual address. Thereafter, the trap handler sets the status of the virtual address page back to protected so that subsequent attempts at writing to the virtual address page will again give rise to a trap.

Once that is done, the trap handler sets the program counter value to a value that is at least one instruction after the particular instruction so that the particular instruction will be skipped and hence, will not be executed (the trap handler has already seen to it that the instruction is given effect; thus, there is no need to execute it anymore). The trap handler then returns from the trap. In this manner, the write to the particular virtual address is performed and recorded, and the trap is re-set to trigger if and when the virtual address page is written to again.

The above discussion describes an embodiment of the all accesses mode of the trap handler. The following discussion describes the page count mode of the trap handler in accordance with one embodiment of the present invention. Initially, the trap handler receives notification that a trap has occurred. Included in this notification is a set of context information, which may comprise, for example, a program counter value and a plurality of internal register values. Based at least partially upon the context information, the trap handler determines which particular instruction caused the trap, and which particular virtual address was to be accessed by the instruction.

After determining the particular virtual address to be accessed, the trap handler updates a set of log information to indicate the accessing of the particular virtual address. In addition, the trap handler changes the status of the virtual address page in which the particular virtual address is encompassed to unprotected. Doing so causes subsequent attempts at writing to the virtual address page to not give rise to a trap. As a result, only the first write to the virtual address page will be recorded by the trap handler. After the status of the virtual address page is changed to unprotected, the trap handler sets the program counter to a value that corresponds to the particular instruction, and returns from the trap. Upon this return, the particular instruction is executed. This time, however, the particular instruction will not be trapped since the virtual address page is no longer protected. Thus, the particular value will be written into the particular virtual address. In this manner, the write to the particular virtual address is performed and recorded, and the trap is disabled so that subsequent writes to the virtual address page will not trigger the trap handler, and hence, will not be recorded by the trap handler.

In some implementations, in addition to recording the particular virtual address that was written to, it may be desirable to map the particular virtual address to a logical component, such as an object or an invocable method. By knowing the logical component that was to be changed by the write, a programmer may be able to further pinpoint the portion of the process that caused the write to be performed. To accommodate such implementations, the trap handler may perform some additional functions. Specifically, in one embodiment, after the trap handler determines the particular virtual address that is to be written to, it determines a mapper that is associated with the particular virtual address. A mapper may be associated with a range of virtual addresses. The mapper is instilled with knowledge of the manner in which the data structures in the particular virtual address range are arranged. After the mapper is determined, the trap handler invokes the mapper, and the mapper maps the particular virtual address to a logical component. For example, the mapper may map the particular virtual address to a particular field of a particular object, or it may map the particular virtual address to the code for a particular invocable method, etc. After it maps the particular virtual address to a logical component, the mapper provides information pertaining to the logical component to the trap handler. The trap handler then updates the set of log information with the information pertaining to the logical component. In this manner, in addition to recording the particular virtual address, the trap handler also captures the logical component that corresponds to the particular virtual address. This and other instrumentation information can be used by a programmer to determine and to improve the memory usage of a process.

DETAILED DESCRIPTION OF EMBODIMENT(S)

Overview

Figure 3:
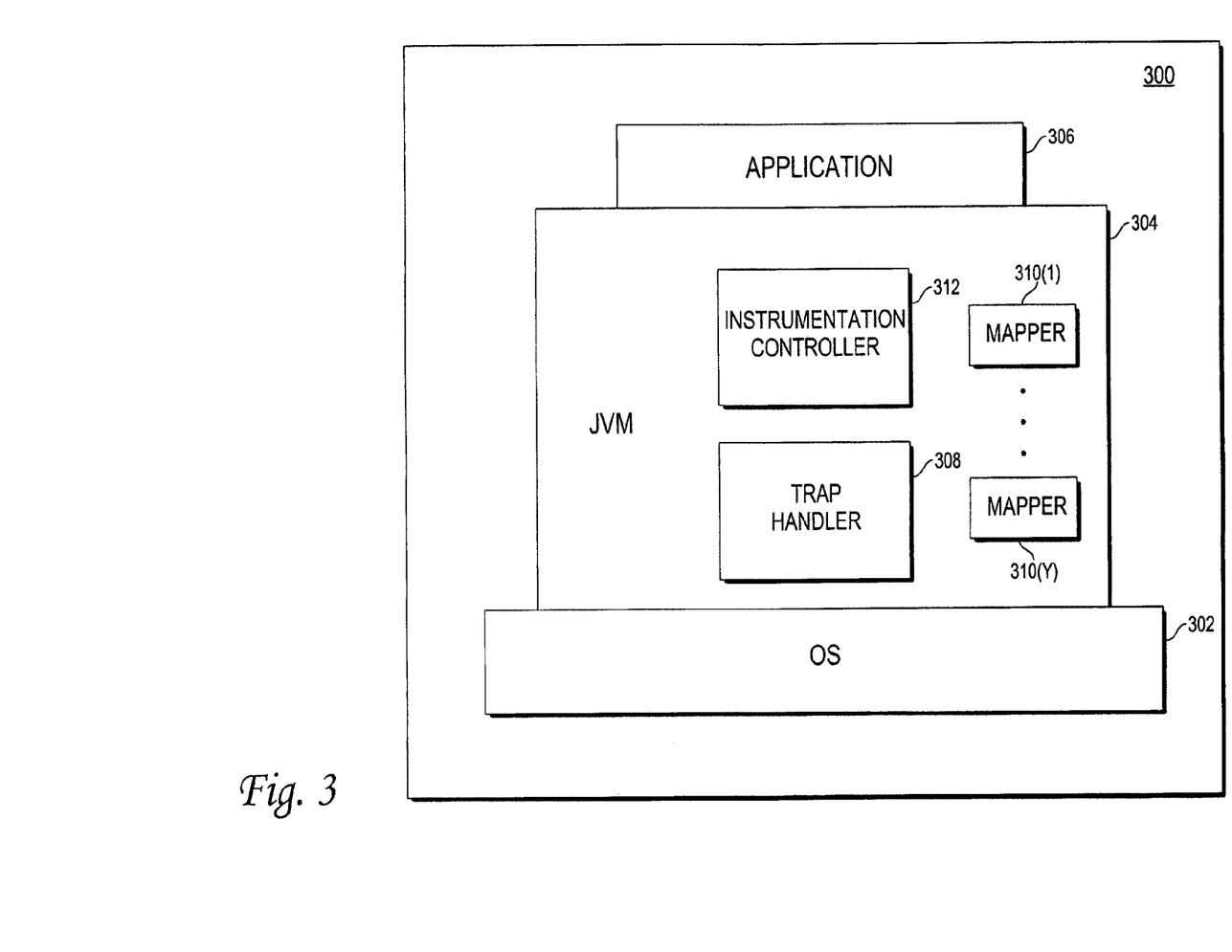
FIG. 3 is a functional block diagram of a system in which one embodiment of the present invention may be implemented.

With reference to FIG. 3, there is shown a functional block diagram of a system 300 in which one embodiment of the present invention may be implemented. For the sake of illustration, an embodiment of the present invention will be described with reference to a JVM. It should be noted, though, that the invention is not so limited. Rather, the concepts taught herein may be applied generally to any process to gain visibility into the memory accesses of that process.

As shown in FIG. 3, the system 300 comprises an operating system 302, a JVM 304, and an application 306. For purposes of the present invention, operating system 302 may be any type of operating system, including but not limited to Solaris, Unix, Linux, Windows, DOS, and MacOs. Operating system 302 provides the low level functionalities relied upon by the other components in the system. These functionalities include, but are certainly not limited to, mapping virtual addresses and virtual address pages to physical memory addresses and physical memory pages, setting the status of certain virtual address ranges to protected or unprotected, registering trap handlers for handling specific types of faults (e.g. write faults), receiving trap notifications from hardware when traps arise, and forwarding the trap notifications to the appropriate trap handlers. The use of these functionalities will be elaborated upon in a later section.

JVM

The JVM 304 executes on top of the operating system 302. In the following discussion, JVM 304 will be the process in which memory accesses will be monitored and recorded. For the sake of simplicity, only one JVM 304 is shown. It should be noted, though, that multiple JVM 304 instances/processes may execute concurrently in system 300. Such JVM instances may include clones that share common data structures and physical memory pages, as shown in FIG. 1. JVM 304 provides the platform for supporting the execution of Java application 306.

Since JVM 304 is the process in which memory accesses are to be monitored, JVM 304 is augmented with a small amount of instrumentation code. In one embodiment, this instrumentation code comprises a trap handler 308, one or more mappers 310, and an instrumentation controller 312. Although FIG. 3 shows these components 308, 310, 312 as being part of the JVM 304, it should be noted that, if so desired, these components may be implemented separately from the JVM 304.

Trap Handler

The trap handler 308 is the component that is invoked to record the memory accesses made by the JVM 304. In one embodiment, the trap handler 308 is invoked in response to write faults. A write fault occurs when an attempt is made to write to a virtual address of the JVM 304 that is within a virtual address range that is protected. When a write fault occurs, the write instruction that caused the write fault is trapped by the hardware of system 300 (since the instruction is trapped, it is not executed), and the trap handler 308 is invoked by the operating system 302 to handle the write fault. As will be explained in greater detail in a later section, in the course of handling the write fault, the trap handler 308 records the virtual address that was to be accessed by the write instruction. In this manner, the access made to the virtual address is recorded. In one embodiment, to enable the operating system 302 to invoke the trap handler 308 for write faults, the trap handler 308 is registered with the operating system 302 when the JVM 304 starts execution. Once registered, the operating system 302 will know to invoke the trap handler 308 for write faults. In one embodiment, only writes to protected virtual address ranges are recorded. However, it should be noted that if so desired, other type of accesses (e.g. reads) may also be recorded. This may be done, for example, by implementing another trap handler that handles another type of fault (e.g. read fault). This and other modifications and enhancements are within the scope of the present invention.

Instrumentation Controller

In one embodiment, when the JVM 304 begins execution, none of its virtual address space is set to a protected status. Thus, all of the virtual addresses can be written to, and no write faults will arise. This in turn means that the trap handler 308 will not be invoked, and if the trap handler 308 is not invoked, then the writes to the virtual addresses will not be recorded. To cause writes to one or more virtual address ranges to be recorded, a user sets those virtual address ranges to a protected status. Once that is done, the next time a virtual address within those ranges is written to, the write instruction will be trapped, and the trap handler 308 will be invoked. When the trap handler 308 is invoked, it will record the virtual address that was written to. In system 300, it is the instrumentation controller 312 that enables a user to set the status of a virtual address range to protected. Specifically, instrumentation controller 312 provides a user interface that allows a user to specify a virtual address range that the user wishes to protect. The instrumentation controller 312 then interacts with the operating system 302 to change the status of that virtual address range to a protected status. Once a virtual address range is protected, any write to a virtual address within the protected virtual address range will give rise to a trap, which in turn, will cause the trap handler 308 to be invoked to record the accessing of the virtual address.

Mappers

In the course of its operation, the trap handler 308 may invoke one or more of the mappers 310. In one embodiment, it is the mappers 310 that map virtual addresses accessed by the JVM 304 to higher level logical components, such as objects and/or invocable methods. By performing this mapping function, the mappers 310 give more meaning to the virtual addresses accessed by the JVM 304. For example, with the mappers 310, rather than knowing just that virtual address X was accessed (e.g. written to), a user can ascertain that a certain field of a certain object that corresponds to address X was accessed. This higher level information gives more meaning to the accessed address, which can be used by a programmer to gain more insight into what caused the access to occur in the first place. This and other benefits are provided by the mappers 310.

In one embodiment, each mapper 310 is associated with a particular virtual address range, and performs mapping for virtual addresses within that range. To enable the trap handler 308 to know which mapper 310 to invoke for which virtual address range, the mappers 310 are registered with the JVM 304 at the time the JVM 304 begins execution. This registration process specifies, for each virtual address range, which mapper 310 should be invoked. The trap handler 308 uses this information to determine, given a virtual address, which mapper 310 to invoke to map that virtual address to a logical component.

Figure 4:
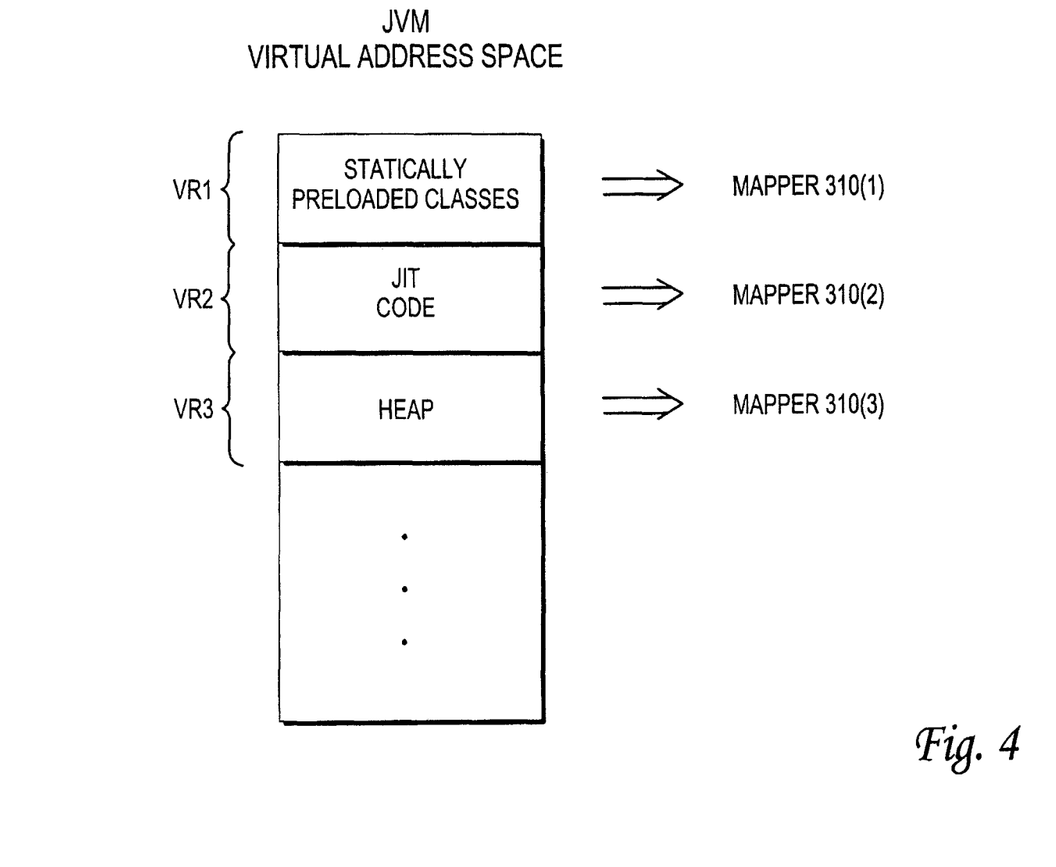
FIG. 4 shows a sample virtual memory space of a process, wherein the virtual memory space has a plurality of virtual address regions, and wherein each region has a mapper associated therewith.

To describe the mappers 310 in greater detail, reference will now be made to FIG. 4, which shows a sample virtual address space of the JVM 304. As shown, the virtual address space of the JVM 304 comprises at least three virtual address ranges, VR1, VR2, and VR3. Each virtual address range comprises one or more virtual address pages (which may be 4 k, 8 k, 16 k, etc. in size, depending upon the particular operating system 302), and stores a different type of information/data. For example, VR1 stores the statically preloaded classes that are used by the JVM 304. VR2 stores the compiled code for the methods that are just-in-time compiled (in Java, methods that are invoked repeatedly are dynamically compiled by the JVM 304 into machine executed code; this compiled code is referred to as just-in-time compiled code or JIT code). VR3 is used for the memory heap, which stores the information that is dynamically created by the JVM 304 during operation, which may include, for example, object data.

The information in each virtual address range is organized in a different manner. That being the case, it is very difficult for a single mapper 310 to be used to perform the mapping function for all of the different virtual address ranges. Thus, in one embodiment, a different mapper 310 is associated with each range. In the example shown in FIG. 4, mapper 310(1) is associated with VR1, mapper 310(2) is associated with VR2, and mapper 310(3) is associated with VR3. Each mapper 310 is programmed with knowledge of how information/data in its associated virtual address range is organized. For example, mapper 310(1) is programmed with knowledge of the manner in which the class information in VR1 is organized. Similarly, mapper 310(3) is programmed with knowledge of the manner in which the object data in the heap is stored. Armed with this knowledge, a mapper 310 can navigate through the information in a virtual address range to extract and decipher higher level information therefrom. For example, given a particular virtual address in the range VR3, the mapper 310(3) can navigate around the information close to the particular virtual address to extract a class name for the object of which the particular virtual address is a part. In addition, by knowing the manner in which object data is organized, the mapper 310(3) can determine which field of the object corresponds to the particular virtual address. With this higher level information, a programmer can ascertain which field of which object class is being updated by the access to the particular virtual address. Similarly, given a particular virtual address in the range VR2, the mapper 310(2) can navigate around the information close to the particular virtual address to extract the name of the compiled method of which the particular virtual address is a part. With this higher level information, a programmer can ascertain which compiled method is being updated by the access to the particular virtual address. By mapping virtual addresses to logical components (e.g. objects and invocable methods) in this manner, mappers 310 provide additional context to help a programmer to understand what is being updated by a write to a particular virtual address.

Sample Operation

With reference to the components described above, a sample operation of one embodiment of the present invention will now be described. In a typical operation, the computer system 300 is started and the operating system 302 is loaded. After the operating system 302 is up and running, the JVM 304 may be started by a user (e.g. by invoking a Java application 306 that requires the JVM 304 to execute). When the JVM 304 is started, it registers the trap handler 308 with the operating system 302 to handle write faults. The JVM 304 also registers the mappers 310 and associates them with the appropriate predetermined virtual address ranges (the range/mapper associations may be those shown in FIG. 4). In one embodiment, the associations between the mappers 310 and the virtual address ranges are stored in a data structure (not shown) that can be accessed by the trap handler 308 when needed. Once that is done, the JVM 304 begins regular operation to support the execution of the Java application 306. In one embodiment, when the JVM 304 is first started, none of its virtual address space is protected.

During normal operation, the JVM 304 may write to and populate certain of its virtual address ranges with information. For example, the JVM 304 may store one or more preloaded classes into VR1. The JVM 304 may also compile one more methods into JIT code and store that JIT code into VR2. The JVM 304 may further store one or more objects into the heap in VR 3. As JVM 304 writes information into these virtual address regions, and more specifically, into the virtual address pages that make up the virtual address regions, the operating system 302 maps the virtual address pages to physical memory pages, and stores the information therein. The operating system 302 manages the virtual address page/physical memory page mappings transparently so that the JVM 304 does not need to be aware of the mappings.

At some point, a user may wish to monitor and to record the accesses, and more specifically, the writes made by the JVM 304 to certain regions of the JVM's virtual address space. To do so, the user uses the instrumentation controller 312 to specify one or more virtual address ranges to monitor. More specifically, using the user interface provided by the instrumentation controller 312, the user sets forth one or more virtual address ranges to protect. The virtual address range(s) set forth by the user may be a single range that encompasses the entire virtual address space of the JVM 304, or they may be one or more subsets of the whole virtual address space. For example, the user may specify ranges VR1 and VR3, or just range VR2, or one or more sub ranges within these ranges. For purposes of the present invention, the user may specify any virtual address range or address ranges within the JVM's virtual address space.

In response to each virtual address range specification received from the user, the instrumentation controller 312 instructs the operating system 302 to set the status of that virtual address range to protected. In turn, the operating system 302 instructs the hardware of system 300 to trap any write instruction that targets a virtual address that is within the virtual address range set forth by the user. In this manner, the system 300 is set up to detect and to trap any attempted writes to a protected virtual address range.

Suppose now that after the user has specified one or more virtual address ranges to be protected, the JVM 302 tries to write to a virtual address that is within one of the protected address ranges. When the hardware of system 300 encounters this write instruction, it determines that a write fault has occurred (since a write is being attempted to a virtual address range that has been protected). Thus, the hardware traps the write instruction and sends a write fault trap notification to the operating system 302. From the previous registration of the trap handler 308, the operating system 302 knows that it is the trap handler 308 that should be invoked to handle this write fault. Thus, the operating system 302 sends a trap notification to the trap handler 308.

As part of this notification, the operating system 302 provides a set of context information. For different operating systems, the set of context information will differ. For example, some operating systems will include the program counter value of the write instruction that caused the trap, while other operating systems will include the program counter value of the instruction after the write instruction that caused the trap. Some operating systems will include the particular virtual address that was to be accessed by the write instructions while others will not. Most operating systems will include the values currently stored in the hardware registers of the system 300. Whatever information is included in the context information, the operating system 302 provides the trap notification to the trap handler 308 for processing.

Figure 5:
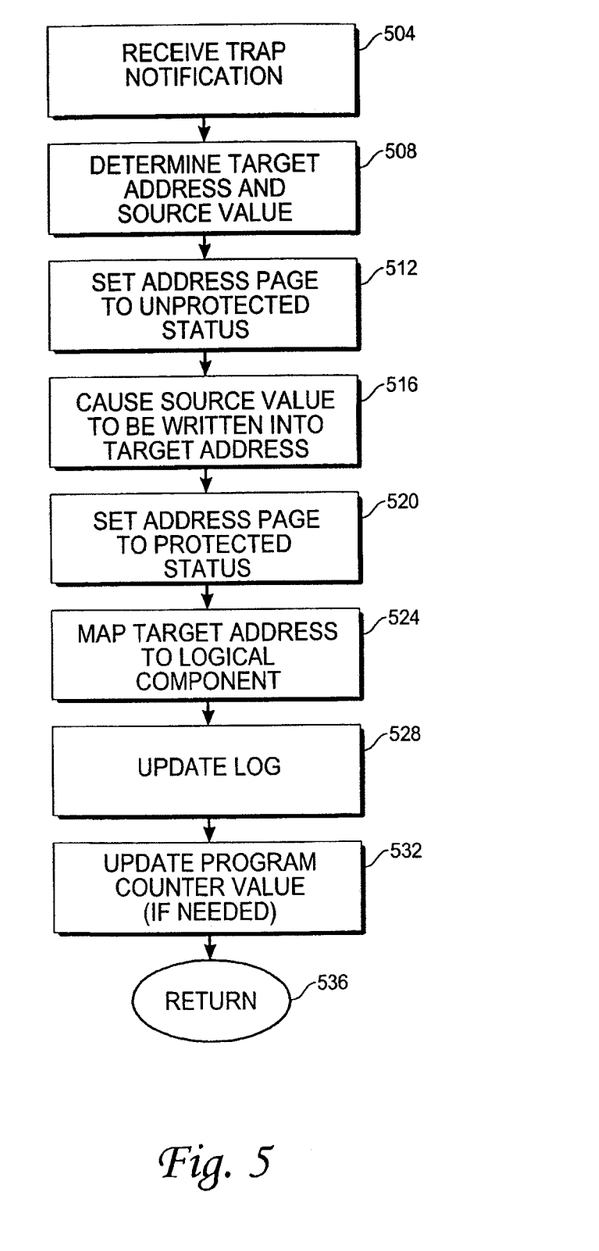
FIG. 5 is a flow diagram illustrating the operation of a trap handler in all accesses mode, in accordance with one embodiment of the present invention.
Figure 6:
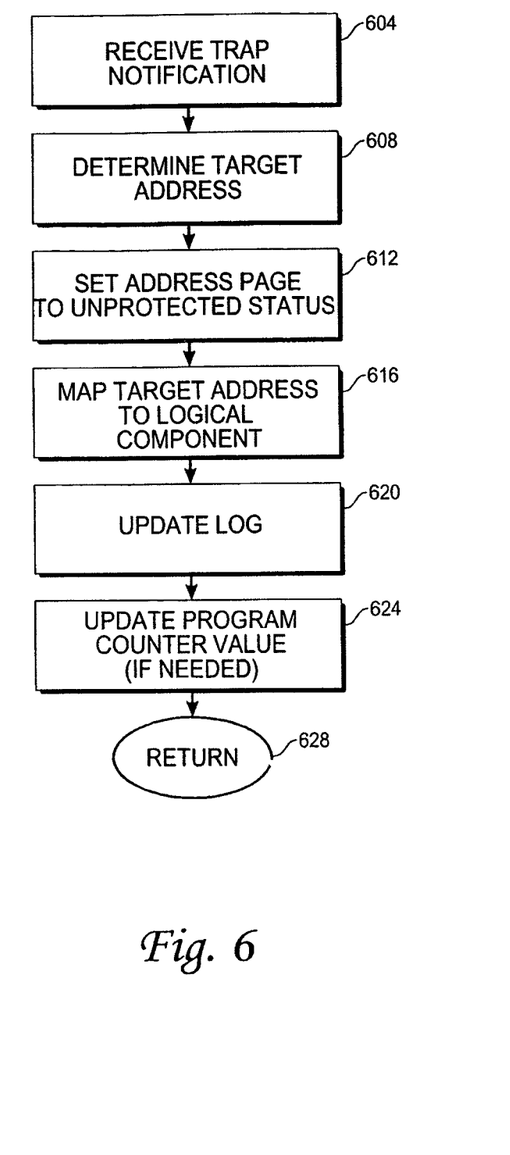
FIG. 6 is a flow diagram illustrating the operation of a trap handler in page count mode, in accordance with one embodiment of the present invention.

In one embodiment, the trap handler 308 operates in one of two modes: (1) all accesses mode; and (2) page count mode. In all accesses mode, the trap handler 308 records all writes to virtual addresses within all protected virtual address ranges. In page count mode, the trap handler 308 records just the first write to any virtual address within a virtual address page of a protected virtual address range. In one embodiment, the mode of operation of the trap handler 308 may be specified by a user using the instrumentation controller 312. FIG. 5 shows a flow diagram of the all accesses mode of operation of the trap handler 308 in accordance with one embodiment of the present invention. FIG. 6 shows a flow diagram of the page count mode of operation of the trap handler 308 in accordance with one embodiment of the present invention.

All Accesses Mode

As shown in FIG. 5, the trap handler 308, in all accesses mode, initially receives (block 504) the trap notification (which includes the context information) from the operating system 302. Based at least partially upon the context information, the trap handler 308 determines (block 508) which particular write instruction caused the trap, which virtual address (referred to as the target address) was to be written to by the write instruction, and what source value was to be written into the target address. In one embodiment, the trap handler 308 makes this determination as follows. If the program counter value included with the context information points to the write instruction, the trap handler 308 will use that program counter value to access the write instruction. If the program counter value points to the instruction after the write instruction, then the trap handler 308 decrements the program counter value and uses the decremented value to access the write instruction.

Once the write instruction is accessed, the trap handler 308 decodes the instruction to determine the source value and the target address. Some operating systems include the target address as part of the context information. If that is the case, then the trap handler 308 simply uses the virtual address provided by the operating system as the target address. To determine the source value and the target address (if that address is not already provided as part of the context information), the trap handler 308 uses the register values provided as part of the context information. To illustrate this, suppose that the write (or store) instruction is that shown below:

st % G1, [% L1+8].

This instruction specifies that the value (the source value) in register G1 should be stored into the virtual address derived by adding 8 to the value in register L1. Thus, to determine the source value, the trap handler 308 looks up the value for register G1 from the context information. To determine the target address, the trap handler 308 looks up the value for register L1 and adds 8 to it. In this manner, the trap handler 308 decodes the instruction, and determines the source value and the target address.

Up to this point, the write instruction has been trapped and hence, has not been executed. To give the write instruction effect (which is what the trap handler wants to do because it does not wish to hinder the operation of the JVM 304), the trap handler 308 causes the source value to be written into the target address. In one embodiment, the trap handler 308 accomplishes this by determining which virtual address page encompasses the target address. The trap handler 308 then instructs the operating system 302 to set (block 512) the status of that virtual address page to unprotected. In turn, the operating system 302 instructs the hardware of system 300 to no longer trap writes to the virtual addresses encompassed by the virtual address page. After that is done, the trap handler 308 causes (block 516) the source value to be written into the target address, which involves a write instruction. Because the virtual address page that encompasses the target address is no longer protected, this write instruction will not give rise to a trap. Thus, the source value will be stored into the target address. Thereafter, the trap handler 308 instructs the operating system 302 to set (block 520) the status of the virtual address page back to protected. In response, the operating system 302 instructs the hardware of system 300 to once again trap writes to the virtual addresses encompassed by the virtual address page. By doing this, the trap handler 308 causes subsequent attempts at writing to the virtual address page to give rise to traps, which will in turn cause the trap handler 308 to be invoked. Thus, the trap handler 308 will be invoked upon every write to the virtual address page (hence, all accesses mode).

In addition to doing the above, the trap handler 308 further maps (block 524) the target address to a logical component. To do so, the trap handler 308 invokes one of the mappers 310. Specifically, in one embodiment, the trap handler 308 uses the data structure created during registration to determine which mapper 310 is associated with the virtual address range that encompasses the target address. The trap handler 308 then invokes that mapper 310 to map the target address to a logical component. For example, if the target address is in VR3, then the trap handler 308 will invoke mapper 310(3) to map the target address to an object class and a field within that object class. If the target address is in VR2, then the trap handler 308 will invoke mapper 310(2) to map the target address to an invocable method. In response to being invoked, the mapper 310 returns to the trap handler 308 a set of information pertaining to theological component that was mapped to the target address (e.g. object class and field, name of invocable method, etc.).

Armed with the logical component information, and the target address that was determined previously, the trap handler 308 updates (block 528) a log to indicate that the target address was accessed, and to set forth the information pertaining to the logical component that was the target of the access. In this manner, the write to the target address is detected and recorded by the trap handler 308. This log information may be rendered to a user at a later time by a visualization tool (not shown) to enable the user to see the results of the memory access monitoring process.

After the log is updated, the trap handler 308 proceeds to update (block 532) the program counter value (if needed). If the program counter value included with the context information points to the write instruction that caused the trap, then the trap handler 308 increments the program counter value by at least one. If the program counter value included with the context information points to the instruction after the write instruction that caused the trap, then the trap handler 308 leave the program counter value as is. The purpose of this operation is to cause the write instruction to be skipped when the trap handler 308 returns. Since the trap handler 308 has already seen to it that the write instruction was given effect, there is no longer any need to execute the write instruction. Thereafter, the trap handler 308 returns from the trap to the operating system 302. When that happens, the updated program counter value (if it was updated) is written back into the program counter, and the hardware of system 300 resumes execution from that point. Since the program counter value has progressed beyond the write instruction that was trapped, the write instruction will not be executed; hence, no trap will arise. In this manner, the write to the target address is performed and recorded, and the trap is re-set to trigger if and when the virtual address page that encompasses the target address is written to again.

Page Count Mode

As shown in FIG. 6, in page count mode, the trap handler 308 initially receives (block 604) the trap notification from the operating system 302. Based at least partially upon the context information included with the trap notification, the trap handler 308 determines (block 608) which particular write instruction caused the trap, and which virtual address (target address) was to be written to by the write instruction. In one embodiment, the trap handler 308 makes this determination as follows. If the program counter value included with the context information points to the write instruction, the trap handler 308 will use that program counter value to access the write instruction. If the program counter value points to the instruction after the write instruction, then the trap handler 308 decrements the program counter value and uses the decremented value to access the write instruction.

Once the write instruction is accessed, the trap handler 308 decodes the instruction to determine the target address. Some operating systems include the target address as part of the context information. If that is the case, then the trap handler 308 simply uses the virtual address provided by the operating system as the target address. To determine the target address if that address was not included with the context information, the trap handler 308 uses the register values provided as part of the context information. Specifically, the trap handler 308 decodes the write instruction, and uses the register values included with the context information to derive the target address. This may be done in the same manner as that described above in connection with the all accesses mode.

Once the target address is determined, the trap handler 308 determines which virtual address page encompasses the target address. The trap handler 308 then instructs the operating system 302 to set (block 612) the status of that virtual address page to unprotected. In turn, the operating system 302 instructs the hardware of system 300 to no longer trap writes to the virtual addresses encompassed by the virtual address page. By doing this, the trap handler 308 causes subsequent writes to the virtual addresses within the virtual address page to not give rise to a trap. If these subsequent write instructions are not trapped, then the trap handler 308 will not be invoked, and those subsequent writes will not be recorded. Hence, only the first write to a virtual address page will be recorded (hence, page count mode).

In addition to doing the above, the trap handler 308 further maps (block 616) the target address to a logical component. To do so, the trap handler 308 invokes one of the mappers 310. The proper mapper 310 may be invoked in the same manner as that described above in connection with the all accesses mode. In response to being invoked, the mapper 310 returns to the trap handler 308 a set of information pertaining to the logical component that was mapped to the target address (e.g. object class and field, name of invocable method, etc.).

Armed with the logical component information, and the target address that was determined previously, the trap handler 308 updates (block 620) a log to indicate that the target address was accessed, and to set forth the information pertaining to the logical component that was the target of the access. In this manner, the write to the target address is detected and recorded by the trap handler 308.

After the log is updated, the trap handler 308 proceeds to update (block 624) the program counter value (if needed). If the program counter value included with the context information points to the write instruction that caused the trap, then the trap handler 308 leaves the program counter value as is. If the program counter value included with the context information points to the instruction after the write instruction that caused the trap, then the trap handler 308 decrements the program counter value by one. The purpose of this operation is to cause the write instruction to be executed when the trap handler 308 returns. The trap handler 308 wants to do this because it does not wish to hinder the operation of the JVM 304. After the program counter is updated, the trap handler 308 returns from the trap to the operating system 302. When that happens, the updated program counter value (if it was updated) is written back into the program counter, and the hardware of system 300 resumes execution from that point. This time, when the write instruction is executed, no trap will result because the virtual address page that encompasses the target address is no longer protected. Thus, the write instruction will cause a source value to be written into the target address. In this manner, the write to the target address is performed and recorded, and the trap is disabled so that subsequent writes to the virtual address page that encompasses the target address will not trigger the trap handler 308, and hence, will not be recorded.

Hardware Overview

Figure 7:
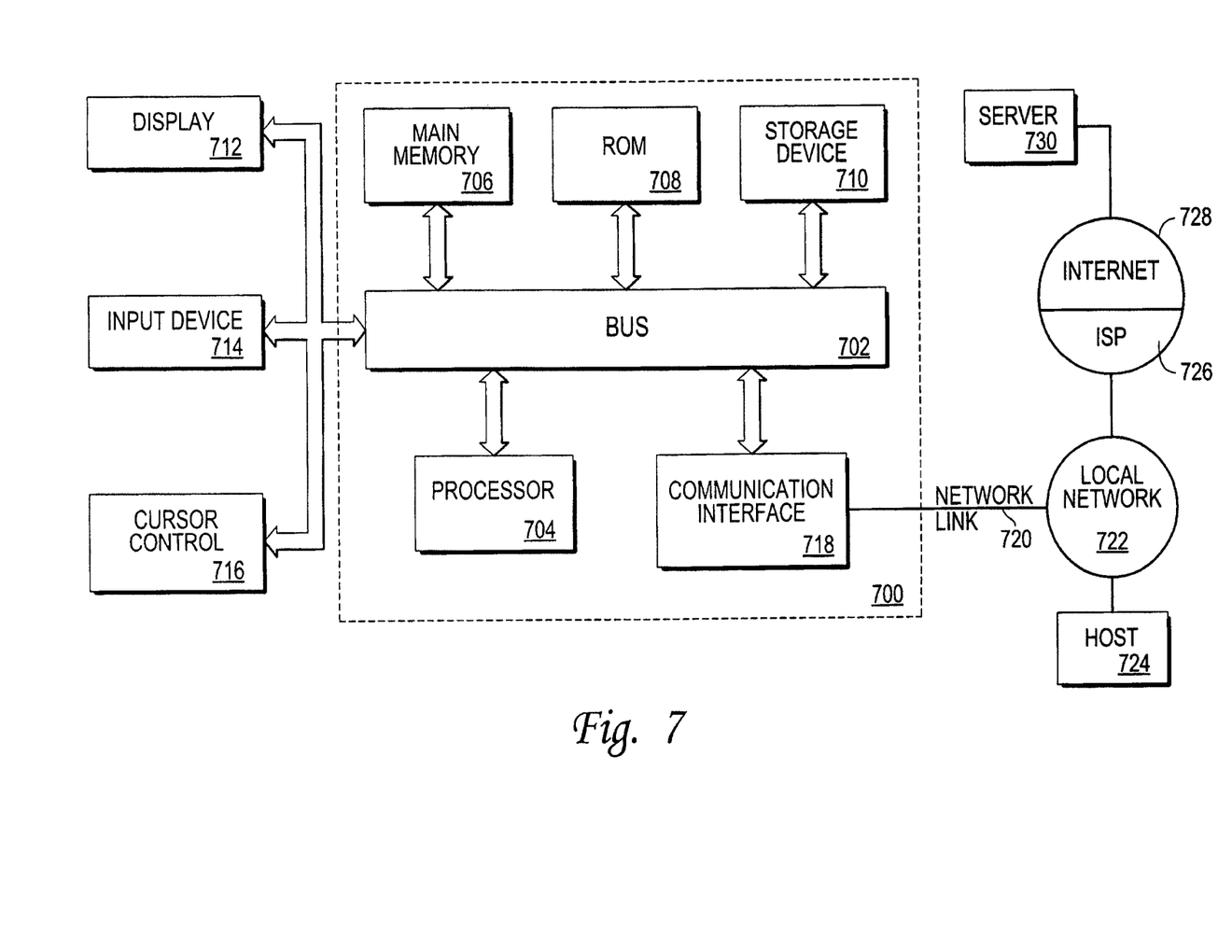
FIG. 7 is a block diagram of a general purpose computer system in which one embodiment of the present invention may be implemented.

In one embodiment, the operating system 302, JVM 304, application 306, trap handler 308, mappers 310, and instrumentation controller 312 take the form of sets of instructions that are executed by one or more processors. FIG. 7 is a block diagram of a computer system 700 upon which these sets of instructions may be executed. Computer system 700 includes a bus 702 for facilitating information exchange, and one or more processors 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions by processor 704. Computer system 700 may further include a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712 for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

In computer system 700, bus 702 may be any mechanism and/or medium that enables information, signals, data, etc., to be exchanged between the various components. For example, bus 702 may be a set of conductors that carries electrical signals. Bus 702 may also be a wireless medium (e.g. air) that carries wireless signals between one or more of the components. Bus 702 may further be a network connection that connects one or more of the components. Any mechanism and/or medium that enables information, signals, data, etc., to be exchanged between the various components may be used as bus 702.

Bus 702 may also be a combination of these mechanisms/media. For example, processor 704 may communicate with storage device 710 wirelessly. In such a case, the bus 702, from the standpoint of processor 704 and storage device 710, would be a wireless medium, such as air. Further, processor 704 may communicate with ROM 708 capacitively. Further, processor 704 may communicate with main memory 706 via a network connection. In this case, the bus 702 would be the network connection. Further, processor 704 may communicate with display 712 via a set of conductors. In this instance, the bus 702 would be the set of conductors. Thus, depending upon how the various components communicate with each other, bus 702 may take on different forms. Bus 702, as shown in FIG. 7, functionally represents all of the mechanisms and/or media that enable information, signals, data, etc., to be exchanged between the various components.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 700, various machine-readable media are involved, for example, in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A machine-implemented method, comprising:
   receiving, by a trap handler, notification of a trap triggered by an attempt to access a particular virtual address by a process, the notification comprising a set of context information;
   determining, based at least partially upon the context information, a particular instruction that caused the trap, wherein the particular instruction has a particular program counter value associated therewith;
   determining, based at least partially upon the context information, the particular virtual address that is to be accessed by the particular instruction;
   mapping, by the trap handler, the particular virtual address to a corresponding logical component targeted by the process via the particular instruction, wherein mapping the particular virtual address to the corresponding logical component comprises determining a class name of an object targeted by the process via the particular instruction;
   updating, by the trap handler, a set of log information for the process to indicate accessing of the particular virtual address and the corresponding logical component targeted by the process;
   causing subsequent accesses of the particular virtual address to not give rise to the trap by instructing an operating system to set a particular virtual address page associated with the particular virtual address to an unprotected status;

after causing subsequent accesses of the particular virtual address to not give rise to the trap, accessing the particular virtual address;

after accessing the particular virtual address:
causing subsequent accesses of the particular virtual address to give rise to the trap by instructing the operating system to set the particular virtual address page to a protected status;
deriving a new program counter value that is greater than the particular program counter value; and
causing the new program counter value to be stored into a program counter, thereby causing the particular instruction to be skipped and not executed.

2. The method of claim 1, wherein the particular virtual address is within the particular virtual address page, and wherein causing subsequent accesses of the particular virtual address to not give rise to the trap comprises:
causing subsequent accesses of the particular virtual address page to not give rise to the trap.

3. The method of claim 1, wherein the particular instruction is a write instruction, and wherein the method further comprises:
determining a source value to be written into the particular virtual address; and
causing the source value to be written into the particular virtual address.

4. The method of claim 3, wherein the context information comprises one or more register values, and wherein determining the source value comprises:
decoding the particular instruction to determine which first subset of register values is relevant to determining the source value; and
determining the source value based at least partially upon the first subset of register values.

5. The method of claim 4, wherein determining the particular virtual address comprises:
decoding the particular instruction to determine which second subset of register values is relevant to determining the particular virtual address; and
determining the particular virtual address based at least partially upon the second subset of register values.

6. A non-transitory machine-readable medium, comprising:
instructions for causing one or more processors to receive, by a trap handler, notification of a trap triggered by an attempt to access a particular virtual address by a process, the notification comprising a set of context information;
instructions for causing one or more processors to determine, based at least partially upon the context information, a particular instruction that caused the trap, wherein the particular instruction has a particular program counter value associated therewith;
instructions for causing one or more processors to determine, based at least partially upon the context information, the particular virtual address that is to be accessed by the particular instruction;
instructions for causing one or more processors to map, by the trap handler, the particular virtual address to a corresponding logical component targeted by the process via the particular instruction, wherein the instructions for causing one or more processors to map the particular virtual address to the corresponding logical component comprise instructions for causing one or more processors to determine a class name of an object targeted by the process via the particular instruction;
instructions for causing one or more processors to update, by the trap handler, a set of log information for the process to indicate accessing of the particular virtual address and the corresponding logical component targeted by the process;
instructions for causing one or more processors to cause subsequent accesses of the particular virtual address to not give rise to the trap by instructing an operating system to set a particular virtual address page associated with the particular virtual address to an unprotected status;
after causing subsequent accesses of the particular virtual address to not give rise to the trap:
instructions for causing one or more processors to access the particular virtual address;
instructions for causing one or more processors to cause subsequent accesses of the particular virtual address to give rise to the trap by instructing the operating system to set the particular virtual address page to a protected status;
instructions for causing one or more processors to derive a new program counter value that is greater than the particular program counter value; and
instructions for causing one or more processors to cause the new program counter value to be stored into a program counter, thereby causing the particular instruction to be skipped and not executed.

7. The machine readable medium of claim 6, wherein the particular virtual address is within the particular virtual address page, and wherein the instructions for causing one or more processors to cause subsequent accesses of the particular virtual address to not give rise to the trap comprise:
instructions for causing one or more processors to cause subsequent accesses of the particular virtual address page to not give rise to the trap.

8. The machine readable medium of claim 6, wherein the particular instruction is a write instruction, and wherein the machine readable medium further comprises:
instructions for causing one or more processors to determine a source value to be written into the particular virtual address; and
instructions for causing one or more processors to cause the source value to be written into the particular virtual address.

9. The machine readable medium of claim 8, wherein the context information comprises one or more register values, and wherein the instructions for causing one or more processors to determine the source value comprise:
instructions for causing one or more processors to decode the particular instruction to determine which first subset of register values is relevant to determining the source value; and
instructions for causing one or more processors to determine the source value based at least partially upon the first subset of register values.

10. The machine readable medium of claim 9, wherein the instructions for causing one or more processors to determine the particular virtual address comprise:
instructions for causing one or more processors to decode the particular instruction to determine which second subset of register values is relevant to determining the particular virtual address; and instructions for causing one or more processors to determine the particular virtual address based at least partially upon the second subset of register values.

* * * * *

UNITED STATES PATENT AND TRADEMARK OFFICE
CERTIFICATE OF CORRECTION

| | |
|---|---|
| PATENT NO. | : 8,769,250 B2 |
| APPLICATION NO. | : 12/554595 |
| DATED | : July 1, 2014 |
| INVENTOR(S) | : Fresko et al. |

It is certified that error appears in the above-identified patent and that said Letters Patent is hereby corrected as shown below:

In the Specification:

In column 10, line 24, delete "theological" and insert -- the logical --, therefor.

Signed and Sealed this
Third Day of March, 2015

Michelle K. Lee
*Deputy Director of the United States Patent and Trademark Office*